(12) United States Patent
Qin et al.

(10) Patent No.: US 9,825,804 B2
(45) Date of Patent: Nov. 21, 2017

(54) DEVICES AND METHODS FOR MONITORING TERMINAL DEVICES

(71) Applicant: Tencent Technology (Shenzhen) Company Limited, Shenzhen (CN)

(72) Inventors: Shouqiang Qin, Shenzhen (CN); Yuan Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 45 days.

(21) Appl. No.: 14/591,422

(22) Filed: Jan. 7, 2015

(65) Prior Publication Data
US 2015/0126123 A1 May 7, 2015

Related U.S. Application Data

(63) Continuation of application No. PCT/CN2014/082203, filed on Jul. 15, 2014.

(30) Foreign Application Priority Data

Aug. 9, 2013 (CN) .......................... 2013 1 0346820

(51) Int. Cl.
*H04B 7/00* (2006.01)
*H04L 12/24* (2006.01)
(Continued)

(52) U.S. Cl.
CPC ............. *H04L 41/06* (2013.01); *H04W 4/008* (2013.01); *H04W 12/06* (2013.01); *H04W 24/08* (2013.01)

(58) Field of Classification Search
CPC ...... H04L 41/06; H04W 12/06; H04W 24/08; H04W 4/008
See application file for complete search history.

(56) References Cited

U.S. PATENT DOCUMENTS

2002/0194500 A1* 12/2002 Bajikar ................. H04L 63/102
  726/35
2005/0035852 A1* 2/2005 Paulsen ................. G07C 5/085
  340/438

(Continued)

FOREIGN PATENT DOCUMENTS

| CN | 101521888 A | 9/2009 |
| CN | 102291257 A | 12/2011 |
| CN | 103037082 A | 4/2013 |

OTHER PUBLICATIONS

Patent Cooperation Treaty, International Search Report and Written Opinion of the International Searching Authority, dated Oct. 20, 2014, in PCT/CN2014/082203.

(Continued)

*Primary Examiner* — Xin Jia
(74) *Attorney, Agent, or Firm* — Jones Day

(57) ABSTRACT

Devices and methods are provided for monitoring terminal devices. For example, one or more first terminal devices are scanned; one or more first identifications of the first terminal devices are recorded; a first list including the first identifications of the first terminal devices is generated; one or more second identifications of one or more second terminal devices are retrieved from a stored second list, the second terminal devices being scanned previously; the second identifications and the first identifications are compared; and in response to the second identifications being different from the first identifications, an alarm message is output.

10 Claims, 3 Drawing Sheets

(51) Int. Cl.
  *H04W 4/00* (2009.01)
  *H04W 12/06* (2009.01)
  *H04W 24/08* (2009.01)

(56) References Cited

U.S. PATENT DOCUMENTS

2008/0220775 A1* 9/2008 Tischer ............... H04L 12/66
                                                    455/435.1
2014/0334335 A1* 11/2014 Barathalwar ......... H04W 48/16
                                                    370/254
2016/0014545 A1* 1/2016 Tian .................... H04W 8/005
                                                    455/41.2

OTHER PUBLICATIONS

Patent Cooperation Treaty, International Preliminary Report on Patentability, dated Feb. 9, 2016, in PCT/CN2014/082203.

* cited by examiner

DEVICES AND METHODS FOR MONITORING TERMINAL DEVICES

CROSS-REFERENCES TO RELATED APPLICATIONS

This application is a continuation of International Application No. PCT/CN2014/082203, with an international filing date of Jul. 15, 2014, now pending, which claims priority to Chinese Patent Application No. 201310346820.1, filed Aug. 9, 2013, both applications being incorporated by reference herein for all purposes.

BACKGROUND OF THE INVENTION

Certain embodiments of the present invention are directed to computer technology. More particularly, some embodiments of the invention provide systems and methods for monitoring technology. Merely by way of example, some embodiments of the invention have been applied to terminal devices. But it would be recognized that the invention has a much broader range of applicability.

Terminal devices are often monitored in various scenarios. For example, in device experience stores and personal home Internet of Things, smart phones (e.g., Android phones and iOS phones), tablets, handheld computers, Personal Computers (PCs), Mobile Internet Devices (MIDs), cameras, and/or other terminal devices are often monitored. Usually, certain monitoring devices, such as an electronic eye, are used to monitor terminal devices. But this monitoring method cannot send timely feedbacks to a user when a terminal device is stolen or is defective.

Hence it is highly desirable to improve the techniques for monitoring terminal devices.

BRIEF SUMMARY OF THE INVENTION

According to one embodiment, a method is provided for monitoring terminal devices. For example, one or more first terminal devices are scanned; one or more first identifications of the first terminal devices are recorded; a first list including the first identifications of the first terminal devices is generated; one or more second identifications of one or more second terminal devices are retrieved from a stored second list, the second terminal devices being scanned previously; the second identifications and the first identifications are compared; and in response to the second identifications being different from the first identifications, an alarm message is output.

According to another embodiment, a device for monitoring terminal devices includes: a device scanning unit configured to scan one or more first terminal devices and record one or more first identifications of the first terminal devices; a list generation unit configured to generate a first list including the first identifications of the first terminal devices; an identification retrieving unit configured to retrieve one or more second identifications of one or more second terminal devices from a stored second list, the second terminal devices being scanned previously; a comparison-and-alarm unit configured to compare the second identifications and the first identifications and, in response to the second identifications being different from the first identifications, output an alarm message; and a storage unit configured to store the second list including the second identifications of the second terminal devices.

According to yet another embodiment, a non-transitory computer readable storage medium includes programming instructions for monitoring terminal devices. The programming instructions are configured to cause one or more data processors to execute certain operations. For example, one or more first terminal devices are scanned; one or more first identifications of the first terminal devices are recorded; a first list including the first identifications of the first terminal devices is generated; one or more second identifications of one or more second terminal devices are retrieved from a stored second list, the second terminal devices being scanned previously; the second identifications and the first identifications are compared; and in response to the second identifications being different from the first identifications, an alarm message is output.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
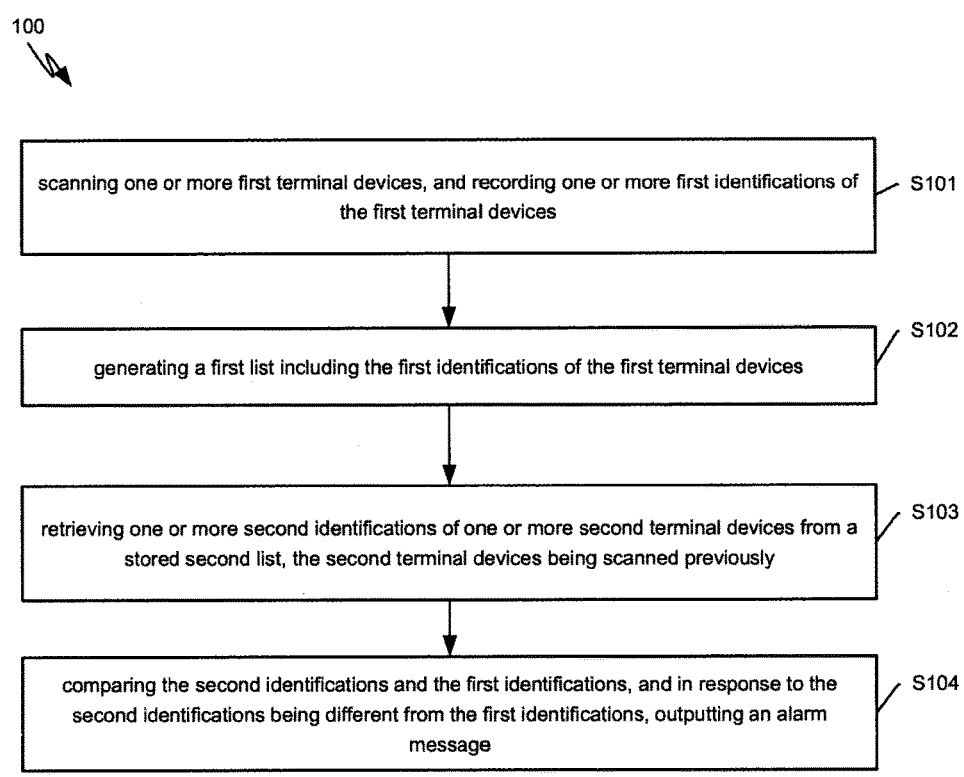
FIG. 1 is a simplified diagram showing a method for monitoring terminal devices according to one embodiment of the present invention.

FIG. 1 is a simplified diagram showing a method for monitoring terminal devices according to one embodiment of the present invention. The diagram is merely an example, which should not unduly limit the scope of the claims. One of ordinary skill in the art would recognize many variations, alternatives, and modifications. The method 100 includes at least processes S101-S104.

According to one embodiment, the process S101 includes: scanning one or more first terminal devices and recording one or more first identifications of the first terminal devices. For example, a monitoring device with a Wi-Fi direct function can be employed to scan the surrounding terminal devices and record the first identifications of the currently scanned first terminal devices. In another example, a monitoring device with a blue-tooth function can be employed to scan the surrounding terminal devices and record the first identifications of the currently scanned first terminal devices. The monitoring device may scan the surrounding terminal devices, and record the first identifications of the currently scanned first terminal devices in a Wi-Fi direct manner or in a blue-tooth manner, according to some embodiments. For example, the identifications of the terminal devices include terminal device names, terminal device identity information, etc.

According to another embodiment, the process S102 includes: generating a first list including the first identifications of the first terminal devices. For example, in the process S101, the monitoring device scans the surrounding terminal devices and records the first identifications A, B, C and D of the currently scanned first terminal devices. As an example, the monitoring device then generates the first list including the first identifications A, B, C and D of the currently scanned first terminal devices based on the first identifications A, B, C and D of the currently scanned first terminal devices. Table 1 shows an example of the first list.

TABLE 1

| First List |
| --- |
| First identifications of first terminal devices that are currently scanned |
| A |
| B |
| C |
| D |

According to yet another embodiment, the process S103 includes: retrieving one or more second identifications of one or more second terminal devices from a stored second list, the second terminal devices being scanned previously. For example, the monitoring device can store the second list including the second identifications of the previously scanned second terminal devices. As an example, the monitoring device can store the second list including the second identifications A, B, C, D and E of the previously scanned second terminal devices. Table 2 shows an example of the second list. The monitoring device may retrieve the second identifications A, B, C, D and E of the previously scanned second terminal devices sequentially from the second list as shown in Table 2, according to some embodiments.

TABLE 2

| Second List |
| --- |
| Second identifications of second terminal devices that are scanned previously |
| A |
| B |
| C |
| D |
| E |

In one embodiment, the process S104 includes: comparing the second identifications and the first identifications, and in response to the second identifications being different from the first identifications, outputting an alarm message. For example, the monitoring device can compare whether the retrieved second identifications of the previously scanned second terminal devices are the same as one of the currently scanned first terminal devices included in the first list. As an example, if the retrieved second identifications of the previously scanned second terminal devices are the same as one of the currently scanned first terminal devices included in the first list, the terminal devices corresponding to the retrieved second identifications are not stolen or are not defective, and the monitoring device does not need to output an alarm. Otherwise, the terminal devices corresponding to the retrieved second identifications are stolen or are defective, and the monitoring device can output the alarm message for timely feedbacks to a user.

In some embodiments, the monitoring device can compare that the retrieved second identifications A, B, C and D of the previously scanned second terminal devices are the same as the first identifications A, B, C and D of the currently scanned first terminal devices included in the first list, respectively. That indicates the terminal devices corresponding to the retrieved second identifications A, B, C and D are not stolen or not defective, and the monitoring devices does not need to output an alarm, according to certain embodiments. For example, a retrieved second identification E of a previously scanned second terminal device is not the same as the first identifications A, B, C and D of the currently scanned first terminal devices included in the first list. That indicates that the terminal device corresponding to the retrieved second identification E is stolen or is defective, and the monitoring device can output the alarm message to timely feedback to the user, in some embodiments. As an example, the alarm message output by the monitoring device includes one or more of the second identifications of the previously scanned second terminal devices that are not the same as the first identifications of the currently scanned first terminal devices included in the first list. A user can timely learn which terminal device corresponding to the second identification is stolen or is defective.

As shown in FIG. 1, the monitoring device can generate the first list including the first identifications of the currently scanned first terminal devices after scanning the surrounding terminal devices and recording the first identifications of the currently scanned first terminal devices, and further retrieve the second identifications of the previously scanned second terminal devices from the second list including the second identifications of the previously scanned second terminal devices, according to some embodiments. The monitoring device then compares whether the retrieved second identifications of the previously scanned second terminal devices are the same as the first identifications of the currently scanned first terminal devices included in the first list, in some embodiments. For example, if the retrieved second identifications of the previously scanned second terminal devices are different from the first identifications of the currently scanned first terminal devices included in the first list, the terminal devices corresponding to the retrieved second identifications of the previously scanned second terminal devices are stolen or defective. As an example, the monitoring device can output the alarm message for timely feedback to the user when the terminal devices are stolen or defective.

Figure 2:
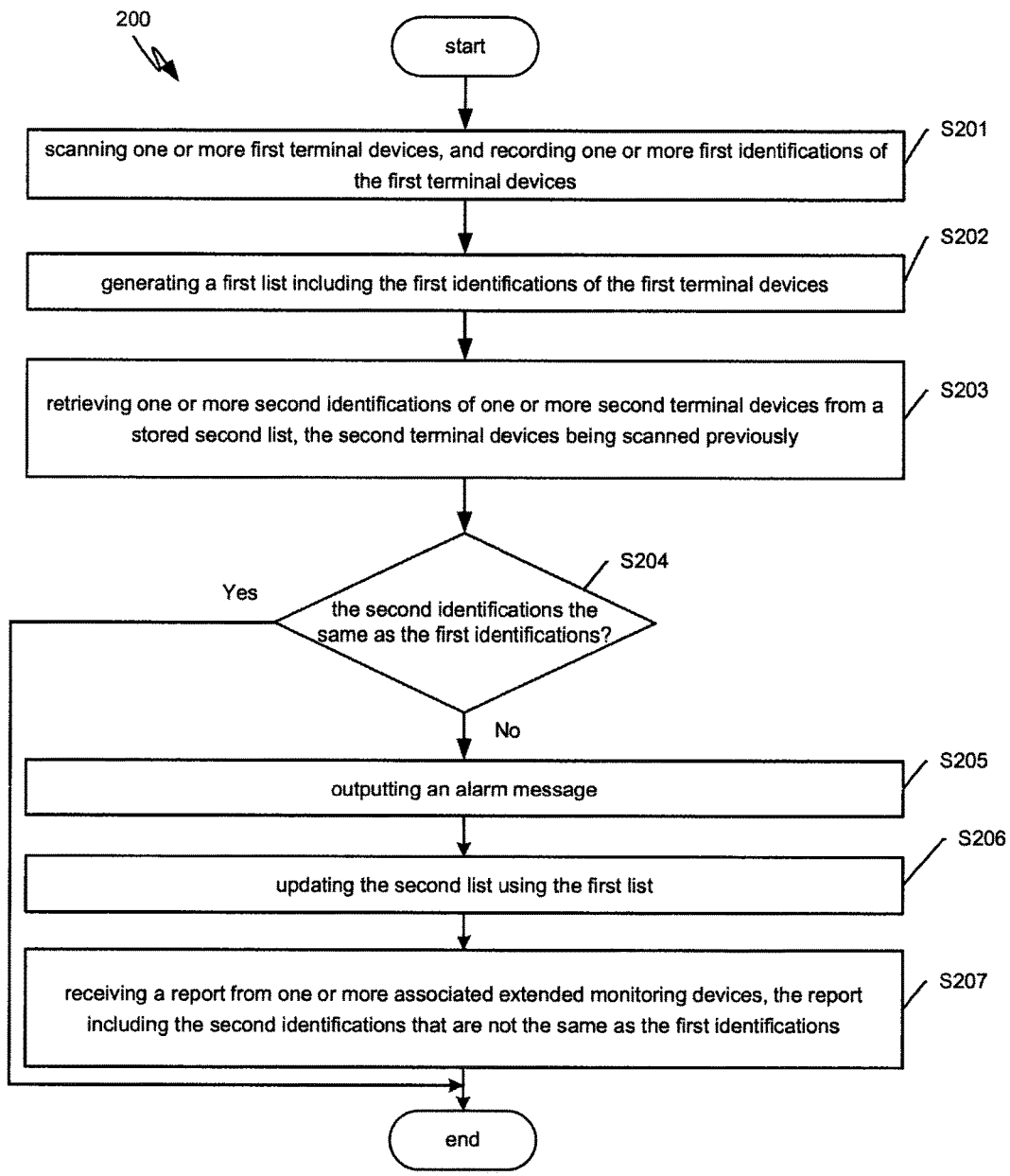
FIG. 2 is a simplified diagram showing a method for monitoring terminal devices according to another embodiment of the present invention.

FIG. 2 is a simplified diagram showing a method for monitoring terminal devices according to another embodiment of the present invention. The diagram is merely an example, which should not unduly limit the scope of the claims. One of ordinary skill in the art would recognize many variations, alternatives, and modifications. The method 200 includes at least processes S201-S207.

According to one embodiment, during the process S201, the monitoring device scans surrounding terminal devices, and records one or more first identifications of the currently scanned first terminal devices. For example, all the terminal devices capable of being monitored can enable a Wi-Fi Direct function or a blue-tooth function. As an example, some of the terminal devices capable of being monitored can enable the Wi-Fi Direct function, and others can enable the blue-tooth function, so that the terminal devices can be scanned. In another example, the monitoring device can scan the surrounding terminal devices, and record the first identifications of the currently scanned first terminal devices in a Wi-Fi direct manner or in a blue-tooth manner. For example, the identifications of the terminal devices include terminal device names, terminal device identity information, etc. As an example, the monitoring device can scan the surrounding terminal devices, and record the first identifications of the currently scanned first terminal devices periodically (e.g., every 15 minutes).

According to another embodiment, during the process S202, the monitoring device generates a first list including the first identifications of the currently scanned first terminal devices based on the first identifications of the currently scanned first terminal devices. For example, in the process S201, the monitoring device scans the surrounding terminal devices and record the identifications A, B, C and D of the currently scanned first terminal devices, so that the monitoring device may generate the first list including the first identifications A, B, C and D of the currently scanned first terminal devices, e.g., as shown in Table 1.

According to yet another embodiment, during the process S203, the monitoring device retrieves one or more second identifications of one or more previously scanned second terminal devices from a stored second list including the second identifications of the previously scanned second terminal devices. For example, the monitoring device can store the second list including the second identifications of the previously scanned second terminal devices. As an example, the monitoring device can store the second list (e.g., as shown in Table 2) including the second identifications A, B, C, D and E of the previously scanned second terminal devices. As another example, the monitoring device can retrieve the identifications A, B, C, D and E of the previously scanned second terminal devices sequentially from the second list as shown in Table 2.

In one embodiment, during the process S204, the monitoring device compares whether the retrieved second identifications of the previously scanned second terminal devices are the same as the first identifications of the currently scanned first terminal devices included in the first list. For example, if the retrieved second identifications of the previously scanned second terminal devices are the same as the first identifications of the currently scanned first terminal devices, the method 200 is terminated. Otherwise, the process S205 is executed.

In another embodiment, during the process S205, the monitoring device outputs an alarm message including the retrieved second identifications of the previously scanned second terminal devices that are not same as the first identifications of the currently scanned first terminal devices included in the first list. For example, the user can timely learn which terminal device corresponding to the second identifications is stolen or is defective, e.g., through the process S205. In another example, the monitoring device can compare whether the retrieved second identifications of the previously scanned second terminal devices are the same as one of the currently scanned first terminal devices included in the first list. As an example, if the retrieved second identifications of the previously scanned second terminal devices are the same as one of the currently scanned first terminal devices included in the first list, the terminal devices corresponding to the retrieved second identifications are not stolen or are not defective, and the monitoring device does not need to output an alarm. Otherwise, the terminal devices corresponding to the retrieved second identifications are stolen or are defective, and the monitoring device can output the alarm message for timely feedbacks to a user.

In some embodiments, the monitoring device can compare that the retrieved second identifications A, B, C and D of the previously scanned second terminal devices are the same as the first identifications A, B, C and D of the currently scanned first terminal devices included in the first list, respectively. That indicates the terminal devices corresponding to the retrieved second identifications A, B, C and D are not stolen or not defective, and the monitoring devices does not need to output an alarm, according to certain embodiments. For example, a retrieved second identification E of a previously scanned second terminal device is not same as the first identifications A, B, C and D of the currently scanned first terminal devices included in the first list. That indicates that the terminal device corresponding to the retrieved second identification E is stolen or is defective, and the monitoring device can output the alarm message to timely feedback to the user, in some embodiments. As an example, the alarm message includes the identification E of a previously scanned terminal device.

According to one embodiment, during the process S206, the monitoring device updates the second list using the first list. For example, the monitoring device can update the second list including the second identifications of the previously scanned second terminal devices to the first list including the first identifications of the currently scanned first terminal devices to prepare for next terminal device monitoring.

According to another embodiment, during the process S207, the monitoring device receives a report sent by one or more associated extended monitoring devices. For example, the report includes the retrieved second identifications of the previously scanned second terminal devices that are not the same as the first identifications of the currently scanned first terminal devices included in the first list, and is sent after the associated extended monitoring devices scan the retrieved second identifications of the previously scanned second terminal devices. As an example, the monitoring device can be associated with one or more extended monitoring devices, where the monitoring device and the extended monitoring devices can be deployed in different areas (e.g., in different areas of a mall or different floors in a mall). When a monitored terminal device is stolen or moved outside a monitoring range of the monitoring device and located in a detection range of one extended monitoring device, the extended monitoring device can scan and send the identification of the terminal device to the monitoring device by a report, according to certain embodiments. For example, after a terminal device that needs to report to the monitoring device is successfully connected with the monitoring device, the terminal device can report the information to the monitoring device via protocols/software at any time.

In certain embodiments, when one or more monitored terminal devices are stolen or moved outside the monitoring range of the monitoring device and located in the detection range of one extended monitoring device, the extended monitoring device can immediately send self-protection instructions to the terminal devices, or interacts with surrounding devices to collect surrounding environment information and/or output alarms after scanning the terminal device identifications of the terminal devices.

In some embodiments, terminal devices that are monitored can detect abnormalities themselves can also report the information to the nearby monitoring device or actively send out an alarm via the software. For example, the monitoring device and the extended monitoring devices can monitor each other, and the extended monitoring devices can be changed into monitoring devices for collecting the report when the monitoring device becomes abnormal.

As shown in FIG. 2, the monitoring device can generate the first list including the first identifications of the currently scanned first terminal devices after scanning the surrounding terminal devices and recording the first identifications of the currently scanned first terminal devices, and further retrieve the second identifications of the previously scanned second terminal devices from the second list including the second identifications of the previously scanned second terminal devices, according to some embodiments. The monitoring device then compares whether the retrieved second identifications of the previously scanned second terminal devices are the same as the first identifications of the currently scanned first terminal devices included in the first list, in some embodiments. For example, if the retrieved second identifications of the previously scanned second terminal devices are different from the first identifications of the currently scanned first terminal devices included in the first list, the terminal devices corresponding to the retrieved second identifications of the previously scanned second terminal devices are stolen or defective. As an example, the monitoring device can output the alarm message for timely feedback to the user when the terminal devices are stolen or defective.

In certain embodiments, the terminal devices that are Wi-Fi enabled can be scanned by the monitoring device with the Wi-Fi Direct function, and the monitoring device can be connected with the terminal devices without authentication if the monitoring device has been connected with the terminal devices in the past. In some embodiments, an effective range of a Wi-Fi Direct signal is wide. For example, within the Wi-Fi signal range, the surrounding terminal devices can be found without a connection so that there is little power consumption related to connection transmission. As an example, the terminal devices are only connected when a connection is required for data transmission, and return to a state of low power consumption after use. In certain embodiments, the user can press a button on any terminal device, or input a Personal Identification Number (PIN) (e.g., a PIN displayed on the terminal device) to easily create a safe connection. For example, automatic connection without manual intervention is supported after the terminal device has established the Wi-Fi Direct connection once. In some embodiments, the monitoring device can be compatible with many existing wireless devices that include Wi-Fi Direct modules via software without additional devices.

Figure 3:
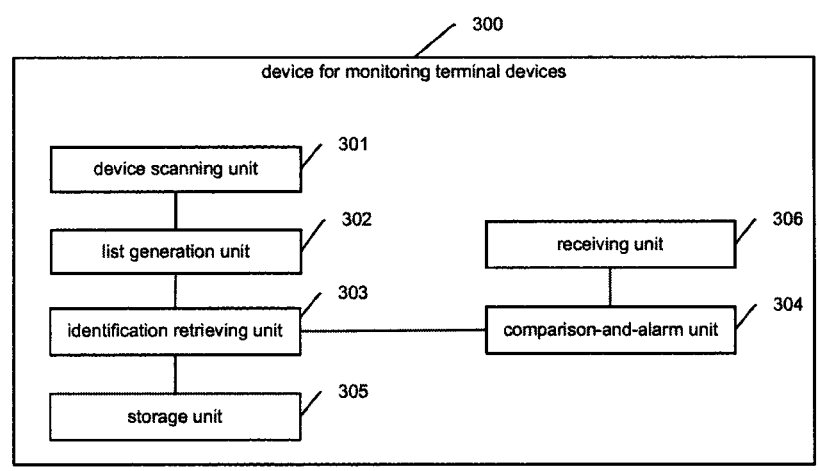
FIG. 3 is a simplified diagram showing a device for monitoring terminal devices according to one embodiment of the present invention.

FIG. 3 is a simplified diagram showing a device for monitoring terminal devices according to one embodiment of the present invention. The diagram is merely an example, which should not unduly limit the scope of the claims. One of ordinary skill in the art would recognize many variations, alternatives, and modifications. The monitoring device 300 includes: a device scanning unit 301, a list generation unit 302, an identification retrieving unit 303, a comparison-and-alarm unit 304, and a storage unit 305.

According to one embodiment, the device scanning unit 301 is configured to scan one or more first terminal devices and record one or more first identifications of the first terminal devices. For example, the list generation unit 302 is configured to generate a first list including the first identifications of the first terminal devices. In another example, the identification retrieving unit 303 is configured to retrieve one or more second identifications of one or more second terminal devices from a stored second list, the second terminal devices being scanned previously.

According to another embodiment, the comparison-and-alarm unit 304 is configured to compare the second identifications and the first identifications and, in response to the second identifications being different from the first identifications, output an alarm message. For example, the storage unit 305 is configured to store the second list including the second identifications of the second terminal devices. For example, the alarm message includes the second identifications of the second terminal devices.

According to yet another embodiment, the device scanning unit 301 is further configured to scan the first terminal devices based on at least information associated with one or more Wi-Fi connections, or further configured to scan the first terminal devices based on at least information associated with one or more blue-tooth connections. For example, the list generation unit 302 is further configured to update the second list stored in the storage unit 305 using the first list. As an example, the monitoring device 300 further includes: a receiving unit 306 configured to, in response to the second identifications being different from the first identifications, receive a report from one or more associated extended monitoring devices, the report including the second identifications that are not the same as the first identifications. As yet another example, the report is sent after the associated extended monitoring devices scan the second identifications of the second terminal devices.

In one embodiment, the comparison-and-alarm unit 304 can start up the receiving unit 306 after comparing that the second identifications of the previously scanned second terminal devices retrieve by the identification retrieving unit 303 are not same as the first identifications of the currently scanned first terminal devices included in the first list generated by the list generation unit 302. For example, the receiving unit 306 can receive the report sent by the associated extended monitoring devices after start-up. As an example, the monitoring device 300 can send timely feedback to a user when a terminal device is stolen or is defective.

According to one embodiment, a method is provided for monitoring terminal devices. For example, one or more first terminal devices are scanned; one or more first identifications of the first terminal devices are recorded; a first list including the first identifications of the first terminal devices is generated; one or more second identifications of one or more second terminal devices are retrieved from a stored second list, the second terminal devices being scanned previously; the second identifications and the first identifications are compared; and in response to the second identifications being different from the first identifications, an alarm message is output. For example, the method is implemented according to at least FIG. 1 and/or FIG. 2.

According to another embodiment, a device for monitoring terminal devices includes: a device scanning unit configured to scan one or more first terminal devices and record one or more first identifications of the first terminal devices; a list generation unit configured to generate a first list including the first identifications of the first terminal devices; an identification retrieving unit configured to retrieve one or more second identifications of one or more second terminal devices from a stored second list, the second terminal devices being scanned previously; a comparison-and-alarm unit configured to compare the second identifications and the first identifications and, in response to the second identifications being different from the first identifications, output an alarm message; and a storage unit configured to store the second list including the second identifications of the second terminal devices. For example, the device is implemented according to at least FIG. 3.

According to yet another embodiment, a non-transitory computer readable storage medium includes programming instructions for monitoring terminal devices. The programming instructions are configured to cause one or more data processors to execute certain operations. For example, one or more first terminal devices are scanned; one or more first identifications of the first terminal devices are recorded; a first list including the first identifications of the first terminal devices is generated; one or more second identifications of one or more second terminal devices are retrieved from a stored second list, the second terminal devices being scanned previously; the second identifications and the first identifications are compared; and in response to the second identifications being different from the first identifications, an alarm message is output. For example, the storage medium is implemented according to at least FIG. 1 and/or FIG. 2.

The above only describes several scenarios presented by this invention, and the description is relatively specific and detailed, yet it cannot therefore be understood as limiting the scope of this invention. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it is understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for monitoring terminal devices, comprising:
scanning, at a monitoring device using Wi-Fi or blue-tooth, surrounding terminal devices at a second time, the monitoring device being associated with one or more extended monitoring devices, wherein the monitoring device and the one or more extended monitoring devices are employed in different areas;
recording one or more second identifications of terminal devices detected through the scanning at the second time;
generating a second list including the second identifications;
scanning, using Wi-Fi or blue-tooth, surrounding terminal devices at a first time, wherein the first time occurs after the second time;
recording one or more first identifications of terminal devices detected through the scanning at the first time;
generating a first list including the first identifications;
comparing the second list of the second identifications and the first list of the first identifications; and
in response to the second list of the second identifications being different from the first list of the first identifications:

outputting an alarm message;
sending a request to scan surrounding terminals to the one or more extended monitoring devices;
in response to sending a request to scan surrounding terminals to the one or more extended monitoring devices:
scanning, at the one or more extended monitoring devices using Wi-Fi or blue-tooth, surrounding terminal devices at a third time, wherein the third time occurs after the first time;
recording one or more third identifications of terminal devices detected through the scanning at the third time;
comparing the third identifications to the second identifications that are different from the first identifications; and
in response to determining a fourth identification of the one or more third identifications, the fourth identification being identical to one of the second identifications that are different from the first identifications:
sending self-protection instructions to a terminal device associated with the fourth identification.

2. The method of claim 1, wherein the alarm message includes the second identifications.

3. The method of claim 1, further comprising:
updating the second list using the first list.

4. The method of claim 1, further comprising:
in response to the second list of the second identifications being different from the first list of the first identifications, receiving a report from the one or more extended monitoring devices, the report including the second identifications that are not the same as the first identifications;
wherein the report is sent after the extended monitoring devices scan for surrounding terminal devices associated with the second identifications.

5. A device for monitoring terminal devices, comprising:
a device scanning unit configured to scan, using Wi-Fi or blue-tooth, surrounding terminal devices periodically and record one or more second identifications of terminal devices detected by the scanning at a second time and one or more first identifications of terminal devices detected by the scanning at a first time, wherein the first time occurs after the second time;
a list generation unit configured to generate a first list including the first identifications and to generate a second list including the second identifications;
a comparison-and-alarm unit configured to compare the second list of the second identifications and the first list of the first identifications and, in response to the second list of the second identifications being different from the first list of the first identifications, output an alarm message;
a storage unit configured to store the second list including the second identifications; and
a receiving unit configured to, in response to the second list of the second identifications being different from the first list of the first identifications, send a request to scan surrounding terminals to one or more extended monitoring devices; wherein:
the device is associated with the one or more extended monitoring devices;
the device and the one or more extended monitoring devices are employed in different areas; and
the one or more extended monitoring devices are configured to, in response to receiving the request to scan surrounding terminals:
scan, using Wi-Fi or blue-tooth, surrounding terminal devices at a third time, wherein the third time occurs after the first time;
record one or more third identifications of terminal devices detected through the scanning at the third time;
compare the third identifications to the second identifications that are different from the first identifications; and
in response to determining a fourth identification of the one or more third identifications, the fourth identification being identical to one of the second identifications that are different from the first identifications:
send self-protection instructions to a terminal device associated with the fourth identification.

6. The device of claim 5, wherein the alarm message includes the second identifications.

7. The device of claim 5, wherein the list generation unit is further configured to update the second list stored in the storage unit using the first list.

8. The device of claim 5, further comprising:
the receiving unit configured to, in response to the second list of the second identifications being different from the first list of the first identifications, receive a report from the one or more extended monitoring devices, the report including the second identifications that are not the same as the first identifications;
wherein the report is sent after the extended monitoring devices scan for surrounding terminal devices associated with the second identifications.

9. The device of claim 5, further comprising:
one or more data processors; and
a computer-readable storage medium;
wherein one or more of the device scanning unit, the list generation unit, the comparison-and-alarm unit, the receiving unit and the storage unit are stored in the storage medium and configured to be executed by the one or more data processors.

10. A non-transitory computer readable storage medium comprising programming instructions for monitoring terminal devices, the programming instructions configured to cause one or more data processors to execute operations comprising:
scanning, at a monitoring device using Wi-Fi or blue-tooth, surrounding terminal devices at a second time, the monitoring device being associated with one or more extended monitoring devices, wherein the monitoring device and the one or more extended monitoring devices are employed in different areas;
recording one or more second identifications of terminal devices detected through the scanning at the second time;
generating a second list including the second identifications;
scanning, using Wi-Fi or blue-tooth, surrounding terminal devices at a first time, wherein the first time occurs after the second time;
recording one or more first identifications of terminal devices detected through the scanning at the first time;
generating a first list including the first identifications;
comparing the second list of the second identifications and the first list of the first identifications; and in response to the second list of the second identifications being different from the first list of the first identifications:

outputting an alarm message sending a request to scan surrounding terminals to the one or more extended monitoring devices;

in response to sending a request to scan surrounding terminals to the one or more extended monitoring devices:

scanning, at the one or more extending monitoring device using Wi-Fi or blue-tooth, surrounding terminal devices at a third time, wherein the third time occurs after the first time;

recording one or more third identifications of terminal devices detected through the scanning at the third time;

comparing the third identifications to the second identifications that are different from the first identifications; and in response to determining a fourth identification of the one or more third identifications, the fourth identification being identical to one of the second identifications that are different from the first identifications:

sending self-protection instructions to a terminal device associated with the fourth identification.

* * * * *